United States Patent [19]

Hurst

[11] 4,120,605

[45] Oct. 17, 1978

[54] WEAR LINERS FOR ABRASIVE-MATERIAL HANDLING EQUIPMENT

[75] Inventor: George P. Hurst, Jackson, Calif.

[73] Assignee: Skega Aktiebolag, Ersmark, Sweden

[21] Appl. No.: 788,195

[22] Filed: Apr. 18, 1977

Related U.S. Application Data

[63] Continuation of Ser. No. 575,773, May 9, 1975, abandoned.

[51] Int. Cl.² .................. F03B 11/00; F04D 7/02; F04D 29/02
[52] U.S. Cl. .................. 415/170 R; 415/174; 415/197; 428/250; 428/256
[58] Field of Search .............. 415/196, 197, 200, 214, 415/170 R, 174; 428/250, 256, 409, 447; 156/114

[56] References Cited

U.S. PATENT DOCUMENTS

| 214,083 | 4/1879 | Beardmore | 428/250 |
|---|---|---|---|
| 666,234 | 1/1901 | McRae | 415/196 X |
| 835,079 | 11/1906 | Nedelski | 156/114 X |
| 1,727,703 | 9/1929 | Hause et al. | 415/197 UX |
| 2,121,068 | 6/1938 | Buechler | 415/196 X |
| 2,365,058 | 12/1944 | Crawford | 415/214 UX |
| 2,759,428 | 8/1956 | Kirby | 415/197 |
| 3,018,736 | 1/1962 | Clay | 415/197 |
| 3,627,613 | 12/1971 | Stolki | 428/256 X |
| 3,660,052 | 5/1972 | Takamatsu et al. | 428/256 X |
| 3,732,028 | 6/1971 | Heynemanns et al. | 415/197 |

FOREIGN PATENT DOCUMENTS

| 341,362 | 1/1931 | United Kingdom | 415/197 |
|---|---|---|---|
| 25,389 of | 1914 | United Kingdom | 156/114 |
| 141,839 | 10/1959 | U.S.S.R. | 415/197 |

Primary Examiner—Carlton R. Croyle
Assistant Examiner—Donald S. Holland
Attorney, Agent, or Firm—Townsend and Townsend

[57] ABSTRACT

Wear liners in abrasive material handling apparatus or equipment in positions to receive the impact and scouring by hard materials such as sharp rocks, broken glass, tin cans, metal pieces and other hard particles at all impact angles including acute angles and at high velocities. Such liners comprise a layer of vulcanized rubber or equivalent material having an impact receiving surface that is smooth and continuous, with one or more sheets of abrasive resistant wire mesh embedded in said layer parallel with and spaced below said surface, and with said sheets, when more than one, spaced from each other and parallel. The rubber or rubber-like material is substantially inseparably vulcanized or bonded to the wires of said sheet or sheets and is of approximately 60 Shore durometer hardness.

8 Claims, 8 Drawing Figures

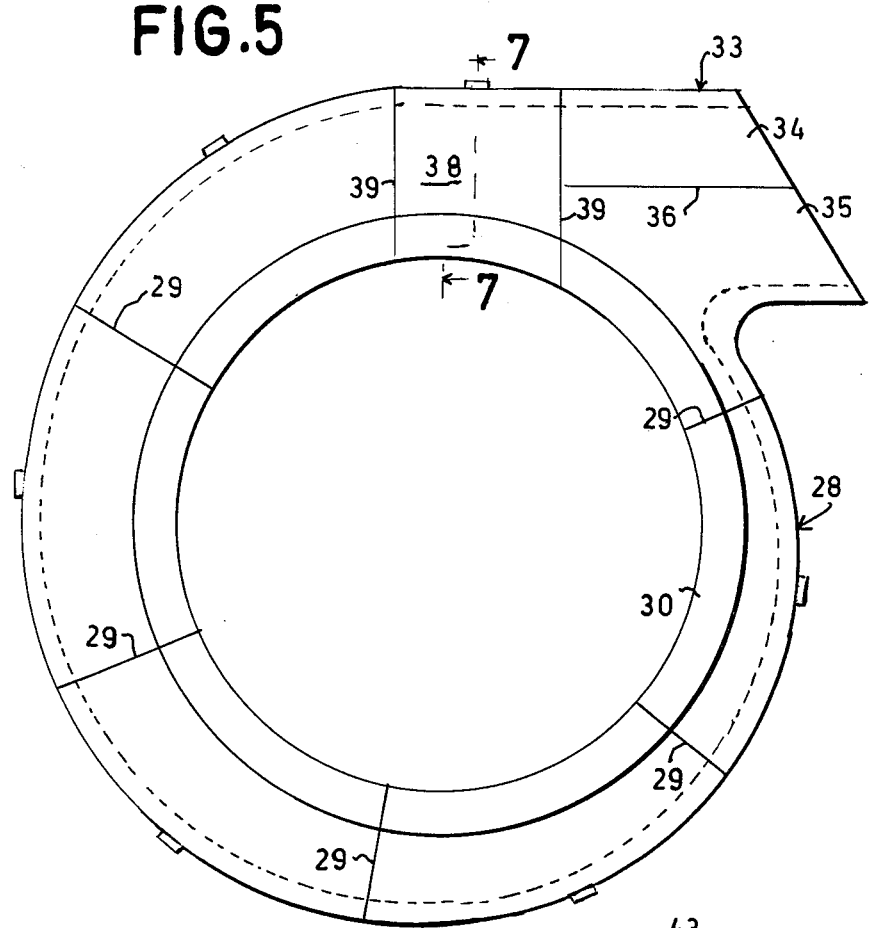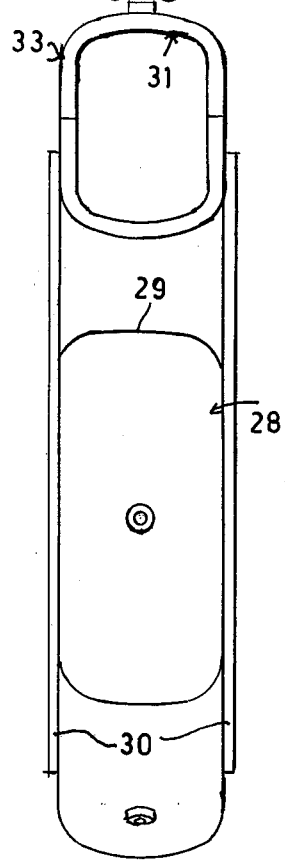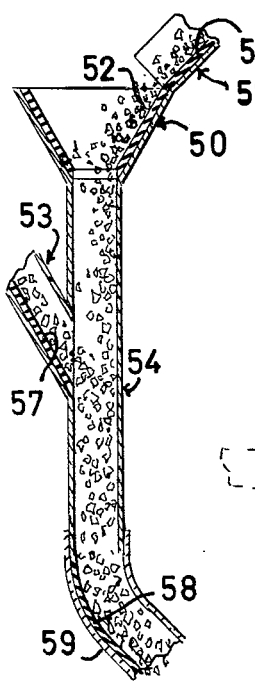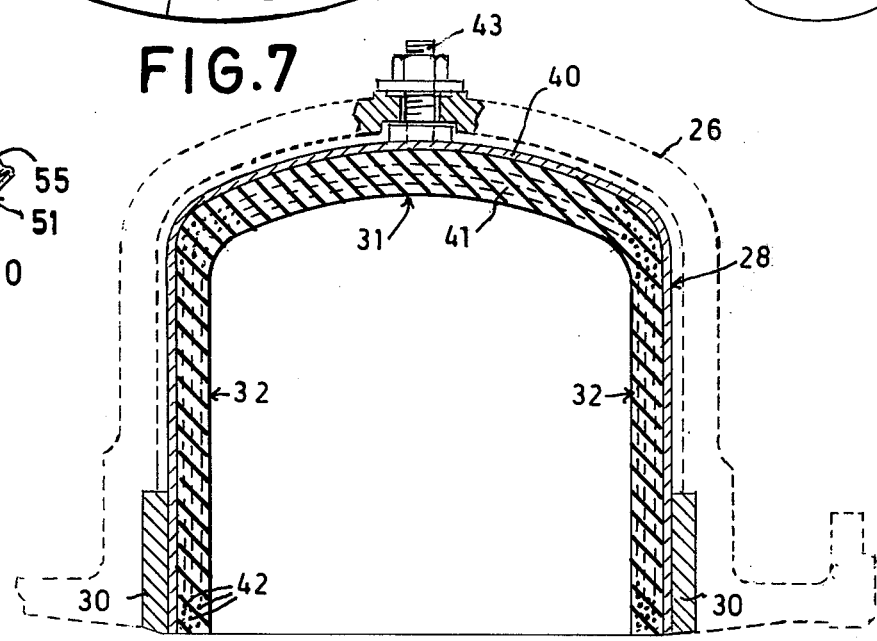

WEAR LINERS FOR ABRASIVE-MATERIAL HANDLING EQUIPMENT

This is a continuation of application Ser. No. 575,773, filed May 9, 1975, now abandoned.

BACKGROUND

Rubber linings in abrasive-material handling equipment such as centrifugal pumps for dredging sand, mud and for pumping slurry are old. The use of such liners is normally for purpose of economy and to enable quick replacement when worn beyond a certain point. Formerly, either no liners were used for dredging or pumping the foregoing materials or cast alloy iron or steel liners were used. Rubber was found to be much more economical, when pumping clean, abrasive sand. However, where the material being pumped or dredged included sharp rocks, broken glass, tin cans, pieces of metal and other sharp hard particles found in trash as may accumulate in the beds of canals, rivers, harbors and other bodies of water, the use of rubber wear components in the centrifugal dredges has been found to be valueless, because the sharp objects remove large pieces of the rubber.

Also, heretofore, rubber liners have been used as impact receiving wear components in hoppers, chutes, and the like to resist the wear due to rocks and the like that are handled, but such liners are not used where the angle of impact is less than forty degrees and the rate of movement of the material thereover is greater than twenty feet per second, due to greatly accelerated wear where these limits are exceeded. Such liners are specially formed to present surfaces having angles of impact as close to ninety degrees as possible to enable the resiliency of the relatively soft rubber to absorb much of the shock free from the shearing effect of a low angle of impact.

Liners in centrifugal dredge and slurry pumps have heretofore been manufactured to provide continuous volute portions circumferentially around the impeller, and continuous door or side walls, although they and the casing may be split in the plane of the volute for insertion and removal of the liners. In either instance the wear is not uniform but occurs in different areas. To extend the life of the costly metal liners, an expensive and time consuming expedient is adopted for building up the worn areas with welding, and applying hard faced welding surfaces. Otherwise the liners are replaced, although extensive areas of the wear surfaces show little wear.

The side or door liners show wear in many instances between the runner-shrouds or discs and the liners adjacent thereto due to movement of the water and abrasive material from the volute portion across the faces of said liners and the inlet under the influence of the high pressure differential between said portion and the inlet portion, the pressure at the latter being negative. This wear across the liners progressively reduces the efficiency of the pump as the wear increases, with a resultant rise in the operation costs. Here again, in the case of the metal liners, resort is made to building up the worn areas with welding.

In the liners hereinafter shown and described, each comprises a layer of rubber or rubber-like material in which the wear surface is smooth. When used hereafter in this application, the term "rubber" shall mean any natural or synthetic, resilient, rubber-like material. Embedded in the rubber layer is one or more sheets of high carbon steel wire mesh material or other tough, abrasive resistant mesh, the wire of which is substantially inseparably bonded or vulcanized to the rubber. This sheet, or sheets where more than one is used, is or are parallel with said wear surface, and in the latter instance the sheets are spaced apart.

The size of the wire and the mesh openings are such as to resist breakage from the impact and abrasion of the materials being dredged, such as hard rocks, broken glass including glass bottles, tin cans, wire, pieces of metal etc. The wire defining the mesh openings protects the rubber therein and prevents the deepening of any areas worn to the sheet and also checks the expansion of such areas. Thus, the mesh sheets provide abrasion resistant wear surfaces.

Where the liners are in hoppers, chutes and the like that take the impact of rocks, aggregate and the like, fed thereto and over which such material is moved, the liners are not necessarily in sections in each installation, and they usually are fairly accessible for installation, removal and replacement. The wear surfaces are smooth thereby offering no unusual resistance to fast movement of the materials thereover, and the angle of impact may be thirty degrees and less to expedite such movement. The liners are of rubber, have the wire mesh sheet or sheets embedded therein and bonded thereto, to provide a lining material having the long wear characteristic of hard alloy metals but at a fraction of the cost.

SUMMARY OF THE INVENTION

One of the objects of the invention is the provision of improved rubber liners for use in abrasive handling equipment in positions to receive the impact and wear from the abrasive material handled and the initial and operating costs of which are a small fraction of the initial and operating costs of conventional hard high alloy steel liners in the same positions in the same equipment handling the same materials under the same conditions.

Another object of the invention is the provision of rubber linings in and for centrifugal dredge and slurry pumps in sections that are selectively removable and replaceable in different areas within the pumps subject to wear from impact with and movement of the abrasive material through the pumps.

Another object of the invention is the provision of a rubber liner in a conventional centrifugal dredge or slurry pump having the long wear characteristics of hard, high alloy steel.

A still further object of the invention is the provision of rubber liners for use in conventional abrasive handling equipment providing wear surfaces therein in engagement with the abrasive material handled by said equipment, and which liners have the long wearing characteristics of conventional hard alloy steels and are suitable for use in handling such materials as hard sharp rocks, broken glass, metal pieces, tin cans, wire and the like.

Other objects and advantages will appear in the drawings and description.

DESCRIPTION OF THE DRAWINGS

FIG. 5 is a side elevational view of a portion of a bladder type liner separate from the outer case.

FIG. 6 is an elevational view of the liner portion of FIG. 5 as seen from the discharge side.

FIG. 7 is an enlarged cross sectional view along line 7—7 of FIG. 6 in which part of the conventional outer case is shown in broken line, except at the liner-attaching bolt, which is in section.

FIG. 8 is a semi-diagrammatic sectional view showing the impact receiving liners in a chute, hopper and conduit.

DETAILED DESCRIPTION

Figure 1:
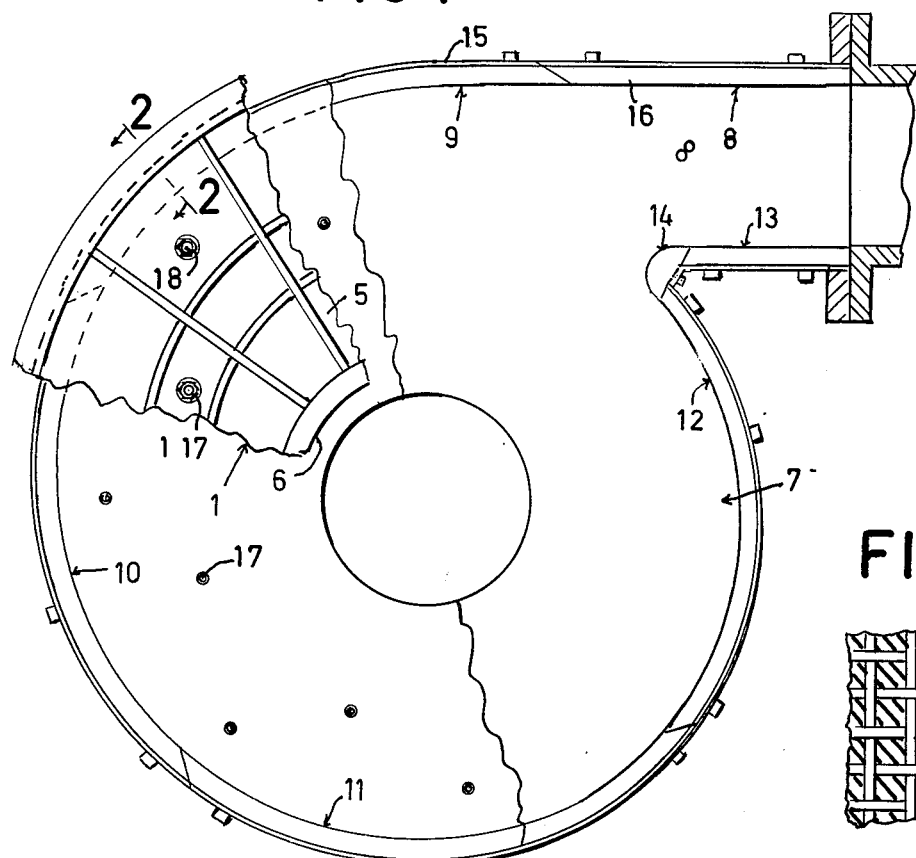
FIG. 1 is side elevational view of a liner for a centrifugal type dredge pump, a portion of the outer case being shown in elevation.
Figure 4:
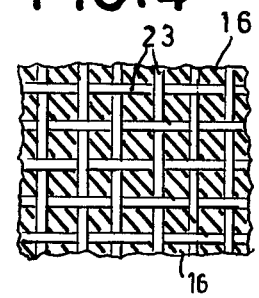
FIG. 4 is an enlarged fragmentary cross sectional view through a portion of the liner showing the wire cloth or wire mesh material therein.

One conventional form of pump housing, generally designated 1, includes a weldment comprising a side 3 (FIG. 2) rigid with a volute shaped periphery 4. A door 5 is removably secured by bolts (not shown) to the weldment in opposed relation to side 3. A central opening 6 (FIG. 1) in said door is for a suction pipe, and an opening in the side 3 coaxial with opening 6 is for the impeller shaft. This structure is old.

The side liner, generally designated 7 extends across the inner surface of side 3, while the volute portion of the liner is formed in sections 8 to 13, the sections 8, 13 defining two of the opposite sides of the outlet. In addition, a nose section 14 is at the acute juncture between sections 12, 13 (FIG. 1). While sections 8, 13 are straight extensions of the volute, they will be called volute sections. A door liner 7' extends across the inner surface of the door 5.

The side and door liner and the volute liners extend completely over the internal surfaces of the pump housing.

Each of the volute sections of the liner comprises a backing plate 15 and a wear liner 16, the latter facing the impeller chamber. The wear liner and backing plate of each section are correspondingly curved, except sections 8, 13 which are straight, and their concavely curved sides face radially inwardly toward the axis of the impeller which is coaxial with opening 6.

The wear liner 16 of each volute section, is of rubber, and is vulcanized to its backing plate. Nuts 17 on stud bolts 18, that, in turn are secured to the backing plate of each volute section, secure the liners rigidly in their positions within the housing 1. Said bolts 18 extend from the backing plates through the volute portion of the housing for releasably holding the sections against spacers 19 that are along the volute periphery 4.

The side liner 7 and the door liner 7' are respectively secured to the side and door by bolts and nuts corresponding to bolts 18 and nuts 1 as indicated in FIG. 1 by the same numbers.

The wear liners 16 in each volute section in a dredge pump, as illustrated, having a 24 × 24 inch outlet, are of uniform thickness of approximately two inches, while the side and door wear liners are a quarter of an inch less in thickness. These wear liners are of rubber in which several sheets or layers 23, 24, 25 of high carbon steel industrial wire cloth of 0.105 inches diameter and with ¼ inch openings are embedded in the rubber before vulcanizing, said layers being parallel with the wearing surface of each liner. The sheet or layer 23 may be ⅜ inch from said surface, with the sheet 24 spaced ½ inch from sheet 23 and from inner layer 25. The layer of rubber 16 is vulcanized after the steel wire mesh or wire cloth is embedded therein and the backing plate is against the back of layer 16, whereby the wire cloth and the backing plate 15 are substantially inseparably bonded to the rubber. The rubber is preferably cured to approximately 60 Shore durometer hardness, and the same procedure is followed with respect to the door and side liners, both of which may be called side liners.

The adjacent ends of the adjacent pairs of volute sections are complementarily bevelled to engage each other when the volute sections are bolted to the volute portion of the outer case, and the inclination of the bevels at opposite ends of each section are in the same direction so that any one of the volute sections may be removed and replaced independently of the others.

The structure enabling the selective removal and replacement of the volute portions of the liner is important because the wear on the liners is not uniform around the volute. Certain sections may wear thin while others show little wear. Also the selective replacement of sections enables lining the pump with the best combination of lining material for the particular job undertaken.

Figure 2:
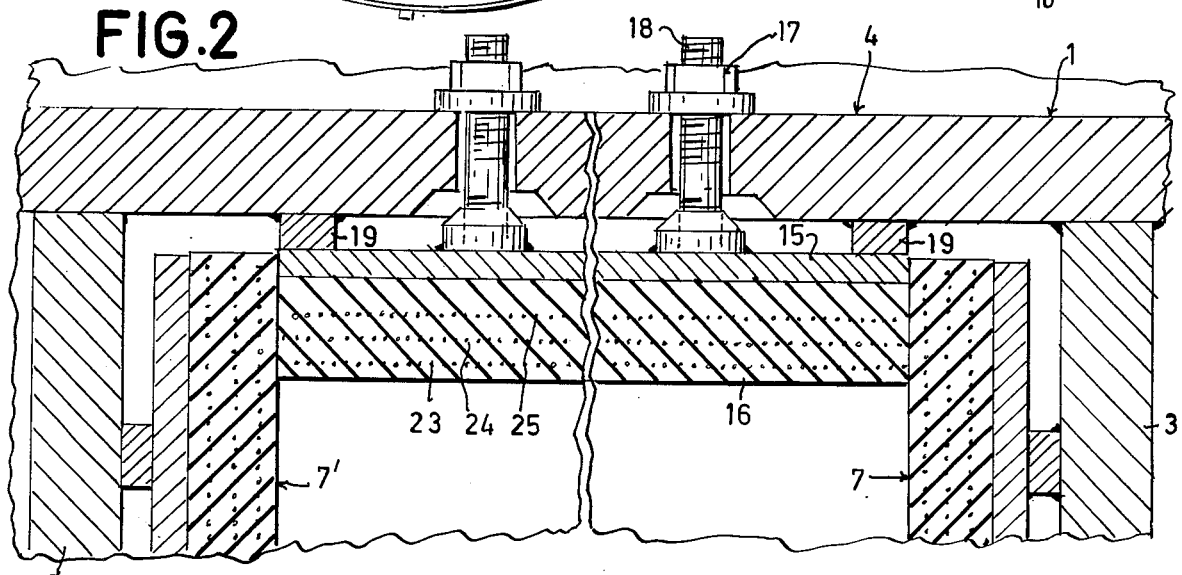
FIG. 2 is an enlarged, fragmentary view along line 2—2 of FIG. 1.
Figure 3:
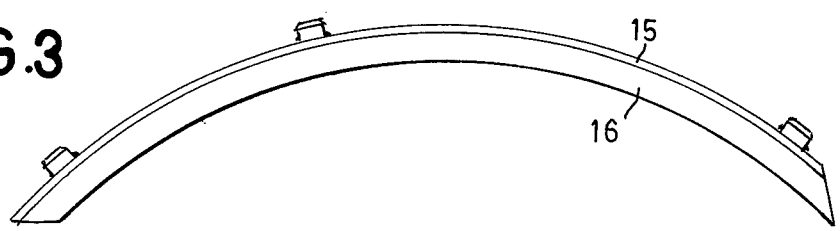
FIG. 3 is an enlarged view of one of the liner sections of the volute portions thereof.

As an alternative to the form of pump liner arrangement shown in FIGS. 1, 2 and 3, the invention may take the form of a bladder type rubber liner, an embodiment of which is illustrated in FIGS. 5-7.

Conventional bladder type liners have taken the form of unitary cast alloy iron or steel liners, and also rubber liners that may or may not be split in one or more planes of the volute.

In the present instance the rubber liner used to line a bladder pump is generally designated 28, and is divided into segments along lines 29 (FIG. 5) that extend radially relative to the axis of the impeller (not shown), but which is coaxial with the rings 30. Each segment includes a portion of the volute 31 and side walls 32 (FIG. 7).

The outlet portion 33 of the liner is preferably divided into portions 34, 35 along line 36 (FIG. 5), and the segment 38 that adjoins one of the ends of sections 34, 35 has parallel end edges 39, whereby said segment 38 provides the key segment that may be removed to free any of the others for replacement. Each of the segments, being of U-shape cross sectional contour has a U-shaped backing plate 40 with the rubber wear liner on the inside and vulcanized thereto, and each liner has U-shaped sheets 42 of high carbon industrial wire cloth embedded in the rubber 41 of the liner in parallel spaced relation to each other and to the inner wear surface of each segment thereby providing liners having the same wear characteristics as the liners in FIGS. 1-4. Bolts 43 (FIG. 7) are adapted to releasably secure the segments within the pump housing shown in phantom as 26 in the same manner as bolts 18.

Most bladder type pumps incorporate side wall or door liners that are bolted to the associated wall or door, and the liner of this invention can be configured to serve as side wall and door liners in the bladder type pump.

While the foregoing structures are preferable, the rubber liner is not to be limited to any particular type of pump case. Also while natural rubber has been found to be preferable in combination with the wire cloth to which it is bonded, it is to be understood that any rubber-like material exhibiting the characteristics of natural rubber with respect to resistance to wear and adherence to metal, may be utilized.

Referring to FIG. 8, the abrasive material handling equipment comprises a hopper 50, a feed chute 51 feeding abrasive material such as rocks or aggregate 52 into the hopper, and a second feed chute 53 feeding similar material into a vertically extending conduit 54 having an angularly downwardly extending extension at its lower end. Liner 55 in chute 51; liner 56 in hopper 50; liner 57 in chute 53 and liner 58 at the lower end of conduit at the juncture between the extension 59 and the vertical portion of the conduit are each of the same rubber and wire mesh structure as the layer 16 in that each contains at least one sheet of the wire mesh material.

FIG. 8 is intended to be illustrative of several different places where the liner is adapted to be used. The angles at which the wear liners positioned relative to horizontal are such as to promote a relatively high velocity of the sharp rocks, etc., thereover, both conditions being considered as detrimental to the lining material whether of metal or rubber, and particularly as to rubber.

In actual use in dredging operations, or in abrasive-material handling apparatus, a sharp object such as a sharp rock, a broken bottle or a piece of iron and the like may mutilate the wear surface of the liner to some extent, but the mutilation will stop at the steel mesh and the rubber will not strip away from the sheet. Ultimately the rubber will be worn to the wire cloth in different places but the wear will not continue to the rubber beyond the wire mesh until the latter is worn through. The wire of the mesh protects the rubber within the mesh openings and the rubber within the openings protects the wire.

Due to the greater wear that occurs in certain areas of the liners, only those that are worn through need be replaced, hence many of the sections will remain unchanged thereby further contributing to the extremely low cost per yard of material dredged or handled.

I claim:

1. A liner for a centrifugal pump for pumping abrasive material, which pump includes an impeller between the opposed sidewalls of a case having a volute surrounding said impeller and extending to the pump outlet, comprising:
   (a) a volute-shaped liner of rubber adapted to be positioned within and to follow said volute having a generally radially inwardly facing wear surface for engagement with the abrasive material pumped by said pump when said liner is within said volute and the impeller is operating;
   (b) a sheet of abrasive resistant wire mesh embedded within said liner disposed parallel with said wear surface providing a mesh surface for resisting wear from abrasion upon such wear of said liner to said mesh surface;
   (c) the rubber of said layer being vulcanized and substantially inseparably bonded to the wires of said sheet and;
   (d) said sheet of abrasive resistant wire mesh being located closer to said wear surface of said layer when said layer is installed in said apparatus than to the opposite surface of said layer.

2. A liner as defined in claim 1 in which:
   (e) the mesh openings of said sheet each being rectangular and said rubber being of approximately 60 Shore durometer hardness.

3. In a liner as defined in claim 1:
   (e) the mesh openings of said sheet being rectangular and each approximately ¼ by ¼ inch in size,
   (f) the rubber of said layer being of approximately 60 Shore durometer hardness.

4. In a liner as defined in claim 1:
   (e) said sheet being one of a plurality of parallel sheets of corresponding wire mesh in spaced opposed relation, all embedded in said layer and each substantially inseparably bonded to said rubber.

5. In a liner as defined in claim 1:
   (e) said liner having spaced opposed radially inwardly extending portions adjacent said sidewalls,
   (f) a sheet of abrasive resistant wire mesh embedded in each of said portions parallel to its wear surface, said sheet of abrasive resistant wire mesh being closer to said wear surface of said portion than to the opposite surface of said portion.

6. A pump liner assembly for a centrifugal pump for abrasive material, which pump includes a housing having a volute shaped portion extending between opposed side wall portions, comprising:
   (a) a layer of rubber, one side of which has a wear surface when said layer is installed in said housing;
   (b) at least one sheet of abrasive resistant wire mesh embedded in said layer parallel with said surface and located closer to said surface than to the opposite surface of said layer, said wire mesh providing a mesh surface for resisting wear from abrasion upon such wear of said layer to said mesh surface;
   (c) the rubber of said layer being substantially inseparably bonded to the wires of said mesh;
   (d) the mesh openings of said sheet each being rectangular and the rubber of said layer being of approximately 60 Shore durometer hardness;
   (e) a backing plate vulcanized to said layer and removably secured to and within said housing;
   (f) said sheet being one of a plurality of parallel sheets of corresponding wire mesh in spaced opposed relation, all embedded in said layer and each substantially inseparably bonded to said rubber.

7. The liner assembly of claim 6, wherein:
   (g) said liner assembly is associated with at least one of said side wall portions.

8. The liner assembly of claim 7, wherein:
   (h) said liner assembly is associated with said volute shaped portion of said housing.

* * * * *